US011095459B2

(12) United States Patent
Martinez et al.

(10) Patent No.: US 11,095,459 B2
(45) Date of Patent: Aug. 17, 2021

(54) AUTOMATIC GENERATION OF APP-SPECIFIC CLIENT CERTIFICATION

(71) Applicant: Microsoft Technology Licensing, LLC, Redmond, WA (US)

(72) Inventors: Christopher Scott Martinez, Woodinville, WA (US); Shovon Nazmus, Bothell, WA (US); Matthew James Wilson, Duvall, WA (US); Jyotirmaya Tripathi, Sammamish, WA (US); Rayman Aeron, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 622 days.

(21) Appl. No.: 15/994,894

(22) Filed: May 31, 2018

(65) Prior Publication Data

US 2019/0372783 A1  Dec. 5, 2019

(51) Int. Cl.
*H04L 9/32* (2006.01)
*G06F 21/62* (2013.01)
(Continued)

(52) U.S. Cl.
CPC ........ *H04L 9/3268* (2013.01); *G06F 21/6218* (2013.01); *H04L 9/321* (2013.01);
(Continued)

(58) Field of Classification Search
CPC ..... H04L 9/3268; H04L 9/321; H04L 9/3247; H04L 63/10; H04L 67/02; G06F 21/6218
See application file for complete search history.

(56) References Cited

U.S. PATENT DOCUMENTS 8,356,075 B2  1/2013 Balko
8,707,027 B1  4/2014 Naik
(Continued)

FOREIGN PATENT DOCUMENTS

WO  2014036021 A1  3/2014

OTHER PUBLICATIONS

Borges et al., Secure and Privacy-Friendly Public Key Generation and Certification, Sep. 2014, IEEE 13th International Conference on Trust, Security and Privacy in Computing and Communications, pp. 114-121) (Year: 2014).*

(Continued)

*Primary Examiner* — Kenneth W Chang
(74) *Attorney, Agent, or Firm* — Liang IP, PLLC

(57) ABSTRACT

Techniques for automatic generation of app-specific client certification are disclosed herein. In one embodiment, a method includes receiving, at a web server in a packaged application containing a co-packaged web client, a connection request from a web client and a first copy of a client certificate from the web client. Upon receiving the client certificate, the web server can authenticate the connection request from the web client using a second copy of a client certificate previously generated by the web server for the co-packaged web client. In response to successfully authenticating, based on both the first and second copies of the client certificate, the web server can establish a secure connection with the web client to allow the web client access to system level services on the computing device. Otherwise, the web server would refuse connection.

20 Claims, 10 Drawing Sheets

(51) Int. Cl.
*H04L 29/06* (2006.01)
*H04L 29/08* (2006.01)

(52) U.S. Cl.
CPC .......... H04L 9/3247 (2013.01); H04L 63/10 (2013.01); *H04L 67/02* (2013.01)

(56) References Cited

U.S. PATENT DOCUMENTS

| | | | |
|---|---|---|---|
| 9,258,128 B1 | 2/2016 | Tytula et al. | |
| 9,294,468 B1 | 3/2016 | Kilbourn | |
| 2005/0081029 A1* | 4/2005 | Thornton | H04L 9/3271 713/156 |
| 2006/0036850 A1* | 2/2006 | Enokida | H04L 63/0869 713/156 |
| 2009/0240936 A1* | 9/2009 | Lambiase | H04L 63/0823 713/156 |
| 2013/0091353 A1* | 4/2013 | Zhang | H04L 9/3268 713/156 |
| 2013/0269019 A1* | 10/2013 | Garmark | G06F 9/54 726/9 |
| 2014/0215213 A1* | 7/2014 | Lund | H04L 9/3273 713/169 |

OTHER PUBLICATIONS

"International Search Report and Written Opinion Issued in PCT Application No. PCT/US2019/033025", dated Jul. 15, 2019, 12 Pages.

"Configuring the server for Certificate Based Authentication with Android devices", Retrieved from: https://www.ibm.com/support/knowledgecenter/en/SSYRPW_9.0.1/Android_CBA.html, Retrieved on: Apr. 12, 2018, 6 Pages.

"Customize the PaperCut NG self-signed certificate", Retrieved from: https://web.archive.org/web/20170411055706/https:/www.papercut.com/products/ng/manual/common/topics/tools-ssl-key-generation-recreate-self-signed.html, Apr. 11, 2017, 3 Pages.

"Deploy User-Specific Client Certificates for Authentication", Retrieved from: https://www.paloaltonetworks.com/documentation/80/globalprotect/globalprotect-admin-guide/authentication/set-up-client-certificate-authentication/deploy-user-specific-client-certificates-for-authentication, Retrieved on: Apr. 12, 2018, 254 Pages.

"Using certificates to secure communication between clients and Application Servers", Retrieved from: https://docs.bmc.com/docs/ServerAutomation/87/configuring-after-installation/administering-security/using-certificates-to-secure-communication-between-clients-and-application-servers, Retrieved on: Apr. 12, 2018, 10 Pages.

McGuire, Cheryl, "Generate and export certificates for Point-to-Site connections using MakeCert", Retrieved from: https://docs.microsoft.com/en-us/azure/vpn-gateway/vpn-gateway-certificates-point-to-site-makecert, Feb. 12, 2018, 17 Pages.

* cited by examiner

AUTOMATIC GENERATION OF APP-SPECIFIC CLIENT CERTIFICATION

BACKGROUND

In computing, a web application or web app is a computer program following a client-server model where the client (typically including a user interface and client-side logic) runs in a web browser. Web applications can use web documents (web pages) written in a standard format such as Hypertext Markup Language (HTML) and JavaScript® supported by a variety of web browsers. Example web applications include webmail, online retail sales, online auctions, wikis, instant messaging services, and many other applications. During a session, a web browser interprets and displays web documents and acts as a universal client for any web application. As such, web applications can offer great flexibility for access via a range of different computing devices such as desktop computers, smart phones, and tablets.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Though web applications can offer great accessibility and other benefits to users and developers, under certain circumstances, deploying an application as a web application may cause certain operational difficulties. For example, by running a web application inside a web browser, the web application typically does not have access to system level services on a computing device because a security boundary or "sandbox" in the web browser isolates the web application from a host operating system of the computing device. Examples of such system level services can include various configuration services (e.g., changing a machine name) or other suitable types of services offered by the host operating system on the computing device.

One solution for the foregoing difficulty is to deploy a web application along with a dedicated web server as a packaged application on the computing device. Such a configuration is sometimes referred to as a "same box" configuration. In operation, the web server can be granted system level access and serves requests for system level services from the web application. The foregoing solution, however, creates risks of potential security breaches from other web applications because the web server not only can serve requests from the co-packaged web application but can also serve requests from other un-authorized web applications running on the same computing device. As such, another web application not having system level access may gain system level access by requesting the web server to perform certain operations. Such operations can circumvent security settings on the computing device.

Several embodiments of the disclosed technology can address certain aspects of the foregoing challenge by implementing automatic generation of app-specific client certification in the packaged application. In one implementation, during installation, modification of access permission, or launch of the packaged application, the web server can be configured to automatically generate a server certificate and a client certificate. The server and client certificates can individually include data representing a private key, a public key, a signature, a subject (e.g., the web server) bound to the foregoing components, or other suitable security data. The web server can then store the generated server and client certificates at a private memory location allocated by, for example, the host operating system to the packaged application. The private memory location is accessible only by the web server and the corresponding web client.

Upon completion of creating and storing the server and client certificates, the web server can be configured to activate the web client by, for example, launching the web client in a web browser. During activation, the web server can be configured to pass, for instance, as arguments in a function call or other suitable types of activation instruction, a digital signature (or "thumb print") or a public key of the web server or an identification of the web server as a trusted certificate authority to the web client. Upon receiving the activation instruction and/or during launching the web client in the web browser, the web client can retrieve, from the private memory location, a copy of the client certificate created by the web server.

Using the automatically generated server/client certificates, the web server and the co-packaged web client can authenticate each other to reduce or prevent a risk of unauthorized web applications from accessing the web server on the computing device. In certain embodiments, the packaged application can implement a Transport Layer Security (TLS) or Secure Sockets Layer (SSL) handshake between the web server and the web client. For instance, the web client can transmit a connection request to the web server along with an identification or other suitable parameters of the web client. In response, the web server can transmit a copy of the server certificate (e.g., containing a public key of the web server) self-signed by the web server. In one implementation, the web client can authenticate the web server by comparing the server certificate with that received as an argument during activation. In another implementation, the web client can identify the web server as a trusted certificate authority and use the public key of the web server to authenticate the server certificate. In further implementations, the web client can authenticate the web server in other suitable ways.

The web client can also transmit a copy of the client certificate to the web server for authentication. Upon receiving the client certificate, the web server can use the copy of client certificate stored in the private memory location to authenticate and verify the web client in a manner generally similar to those described above with respect to authenticating the web server. Once authenticated, the web server can allow the requested connection based on which the web client can access various system level services via the web server. In other embodiments, the packaged application can also implement 3-way, 4-way, or other suitable types of handshake protocols for establishing the connection between the web server and the web client in the packaged application.

Several embodiments of the disclosed technology can thus reduce or prevent risks of an unauthorized web client from accessing the web server in the packaged application. When an unauthorized web client requests a connection with the web server, the unauthorized web client would not have access to the private memory location allocated to the packaged application. As such, the unauthorized web client could not provide any or a correct client certificate to the web server for authentication. As a result, the web server in the packaged application would refuse the connection request and thus prevent the unauthorized web client from access any system level services via the web server.

DETAILED DESCRIPTION

Figure 1A:
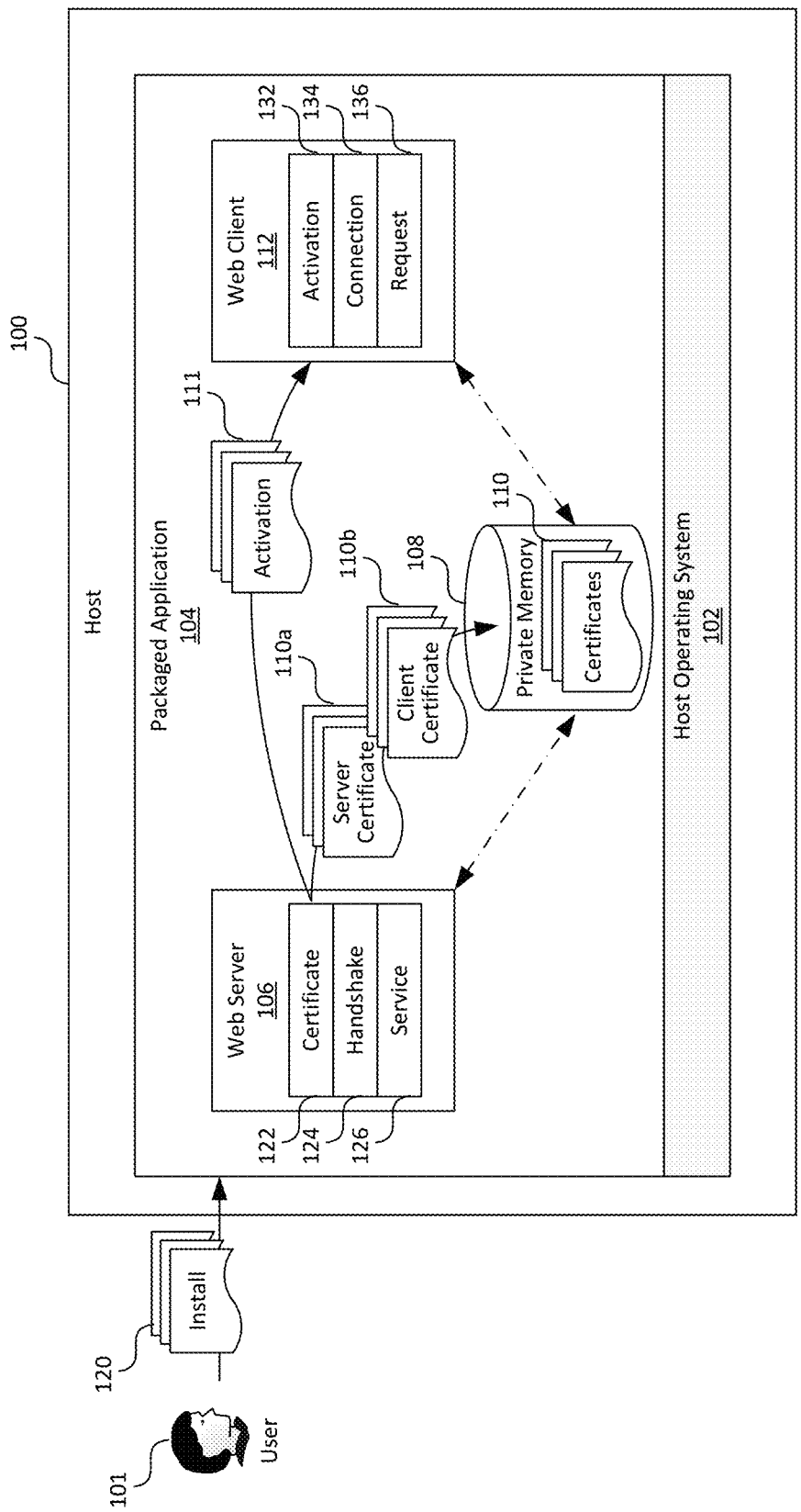
FIGS. 1A and 1B are schematic diagrams illustrating a host supporting a packaged application configured to automatically generate an app-specific client certification in accordance with embodiments of the disclosed technology.

Certain embodiments of systems, devices, components, modules, routines, data structures, and processes for automatic generation of app-specific client certificate are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1A-4.

As used herein, a "host computing device" or "host" generally refers to a computing device configured to support execution of one or more applications or computer programs. In certain embodiments, the host can include a host operating system configured to support execution of applications or computer programs. In other embodiments, the host can also support implementation of, for instance, one or more virtual machines (VMs), containers, or other suitable virtualized components. For example, a host can include a server having a hypervisor configured to support one or more virtual machines, containers, or other suitable types of virtual components. The one or more virtual machines or containers can be used to launch and execute suitable applications or computer programs to provide corresponding computing services.

Also used herein, a "host operating system" generally refers to an operating system deployed to interact directly with hardware components of a computer device (e.g., a server) and can grant or deny system level access to services provided by the host operating system. In certain implementations, a hypervisor (e.g., a hosted hypervisor) can run on top of a host operating system rather than interacting directly with the hardware components of the computing device. The hypervisor can then create, manage, or otherwise support one or more VMs or containers each having a "guest operating system" or "guest" separated from the host operating system by a security boundary. In certain implementations, a guest operating system may not be the same as a host operating system supporting the guest operating system.

Further used herein, a "virtual memory" generally refers to abstracted storage resources available on a computing device. A host operating system, using a combination of hardware and software, can map memory addresses used by a virtual machine or container ("virtual addresses") into physical addresses in a memory and/or storage (e.g., a hard drive) on the computing device. A virtual memory, as seen by a virtual machine or container, may appear as a contiguous address space or collection of contiguous segments. The host operating system can manage and facilitate operations of virtual address spaces and corresponding assignment of underlying physical memory to the virtual memory. Once assigned, a virtual machine, container, or application may use the assigned virtual memory as if the virtual memory were a physical memory suitable for executing instructions of applications.

Furthermore, a "memory location" as used herein generally refers to a block, segment, page, or other suitable divisions of memory identifiable to software and hardware in a computing device by a memory address or memory address range. In certain implementations, memory addresses can include fixed-length sequences of digits (e.g., in hexadecimal) displayed and manipulated as unsigned integers. For instance, an example memory location can be at an example memory address of "FBFF FFFF." In other implementations, memory addresses can include other suitable types of identifiers.

Also used herein, "asymmetric cryptography" generally refers to a cryptographic technique that uses pairs of public and private keys. Public keys may be shared with other components in the host while private keys are accessible only to a designated component such as a web server or web client in a packaged application. As described in more detail later, private/public keys can be used to authenticate the web server and the web client to each other, thereby preventing unauthorized web application from accessing the web server. Examples of public and private keys can include a string of 64-, 128-, 256-, or other suitable numbers of bits. Though embodiments of the technique described herein use asymmetric cryptography as an example authentication technique, in other embodiments, the packaged application can also implement symmetric cryptography in which both the web server and the web client can have the same cryptography key.

Further used herein, a "packaged application" generally refers to an application that contains a web server and a corresponding web client configured to cooperate with the web server for achieving certain designed functions. In an outward appearance, a packaged application appears to be a single executable entity. In certain embodiments, the web server can be assigned a port (e.g., port 80) on a network interface card (NIC) of the host. The co-packaged web client can then, upon establishment of a connection, access the web server via the assigned port of the web server in a loop-back fashion. In other embodiments, the web client can access the web server in other suitable fashions.

Deploying a web server and a web client in a packaged application in a "same box" configuration can create potential risks of unauthorized access to system level services on a host. For example, the web server can be granted system level access and serves requests for system level services from the web application. However, other un-authorized web applications running on the same computing device may also access the web server to serve unauthorized service requests. As such, other unauthorized web applications not having system level access may gain system level access via the web server to circumvent security settings on the computing device.

Several embodiments of the disclosed technology can address certain aspects of the foregoing challenge by implementing automatic generation of app-specific client certification in the packaged application. During installation, modification of access permission, or launch of the packaged application, the web server can be configured to automatically generate a server certificate and a client certificate. The web server can then store the generated server and client certificates at a private memory location allocated by, for example, the host operating system to the packaged application. The private memory location is accessible only by the web server and the corresponding web client.

Upon completion of creating and storing the server and client certificates, the web server can be configured to activate the web client by, for example, launching the web client in a web browser. During activation, the web server can be configured to pass, for instance, as arguments in a function call or other suitable types of activation instruction, a digital signature (or "thumb print") or a public key of the web server or an identification of the web server as a trusted certificate authority to the web client. Upon receiving the activation instruction and/or during launching the web client in the web browser, the web client can retrieve, from the private memory location, a copy of the client certificate created by the web server. Using the automatically generated server and client certificates, the web server and the co-packaged web client can authenticate each other to reduce or prevent a risk of unauthorized web applications from accessing the web server on the computing device, as described in more detail below with reference to FIGS. 1A-4.

FIG. 1A is a schematic diagram illustrating a host 100 supporting a packaged application 104 configured to automatically generate an app-specific client certification in accordance with embodiments of the disclosed technology. The host 100 can be a server, a desktop or laptop computer, a smart phone, or other suitable types of computing device. Though only particular components of the host 100 are shown in FIG. 1, in other embodiments, the host 100 can include additional and/or different hardware and/or software components, such as those example components described below with reference to FIG. 4.

In FIGS. 1A and 1n other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 1A, the host 100 can include a host operating system 102 configured to support installation and execution of the packaged application 104. Even though the packaged application 104 is shown in FIG. 1A as directly installed or executed on top of the host operating system 102, in other embodiments, the packaged application 104 can also be installed or executed in a virtual machine, container, or other suitable virtual components supported by the host operating system 102. In FIG. 1A, the operations of automatic generation of app-specific client certification are described in the context of installation for illustration purposes. In other embodiments, the operations can also be performed in response to modification of access permission or launch of the packaged application 104 in the host 100.

Also shown in FIG. 1A, the package application 104 can include a web server 106, a web client 112, and a private memory 108 that is a block of virtual memory allocated to the packaged application 104 by, for example, the host operating system 102. In certain implementations, the web server 106 and the web client 112 can both be operating inside a security boundary or "sandbox" defined by the host operating system 102. The web server 106 can be granted certain permissions for access system level services provided by the host operating system 102 while the web client 112 does not have direct access to such system level services.

In certain embodiments, the web server 106 can include a standalone software program configured to serve contents in response to incoming requests according to Hypertext Transfer Protocol (HTTP) protocol or other suitable types of network protocols. In other embodiments, the web server 106 can also include an extension to a local web server (not shown) on the host 100. As shown in FIG. 1A, in accordance with embodiments of the disclosed technology, the web server 106 can include a certificate component 122, a handshake component 124, and a service component 126 operatively coupled to one another. Though particular components of the web server 106 are shown in FIG. 1A, in other embodiments, the web server 106 can also include an interface component or other suitable types of component.

As shown in FIG. 1A, upon receiving an installation request 120 from a user 101, the host operating system 102 can, for instance, download the packaged application 104 via a computer network (e.g., the Internet), and store/install the downloaded package application 104 in the host operating system 102. Upon being installed, the certificate component 122 of the web server 106 can be configured to automatically generate a server certificate 110a and a client certificate 110b.

As used herein, a server/client certificate 110a and 110b generally refers to a data package representing a digital certificate or identity certificate to prove ownership of an identity. In certain embodiments, the server and client certificates 110a and 110b can individually include data representing a private key, a public key, a digital signature, a subject (e.g., the web server 106 or the web client 112) bound to the foregoing components, or other suitable security data. In other embodiments, the server and client certificates 110a and 110b can also include designation of trusted certificate authorities and corresponding network addresses. In further embodiments, the server and client certificates 110a and 110b can also include one or more of an identification of the installed instance of the packaged application 104, an identification of the installed web server 106, or an identification of an extension of the installed web server 104, or other suitable information.

The certificate component 122 of the web server 106 can then be configured to store the generated server and client certificates 110a and 110b at the private memory 108. In certain implementations, the certificate component 122 can store the server and client certificates 110a and 110b at certain reserved or designated memory locations in the private memory 108. In other implementations, the certificate component 122 can store the server and client certificates 110a and 110b at random memory locations in the private memory 108. In any of the foregoing embodiments, the memory locations holding the server and client certificates 110a and 110b in the private memory location are accessible only by the web server 106 and the web client 112.

As shown in FIG. 1A, upon completion of creating and storing the server and client certificates 110a and 110b, the web server 106 can be configured to activate the web client 112 by, for example, launching the web client 112 in a web browser (not shown) via transmitting an activation instruction 111. In certain embodiments, the activation instruction 111 can be a function call (e.g., an application programming interface, or API call), and the web server 106 can be configured to pass, for instance, as arguments in the function call a digital signature (or "thumb print") or a public key of the web server 106 or an identification of the web server 106 as a trusted certificate authority to the web client 112. In other embodiments, the activation instruction 111 can include other suitable types of activation instruction.

The web client 112 can include a software program configured request content or services from the web server 106 according to, for example, the HTTP protocol. As shown in FIG. 1A, the web client 112 can include an activation component 132, a connection component 134, and a request component 136 operatively coupled to one another. Though particular components of the web client 112 are shown in FIG. 1A, in other embodiments, the web client 112 can also include a network component, a display component, or other suitable types of component.

Figure 1B:
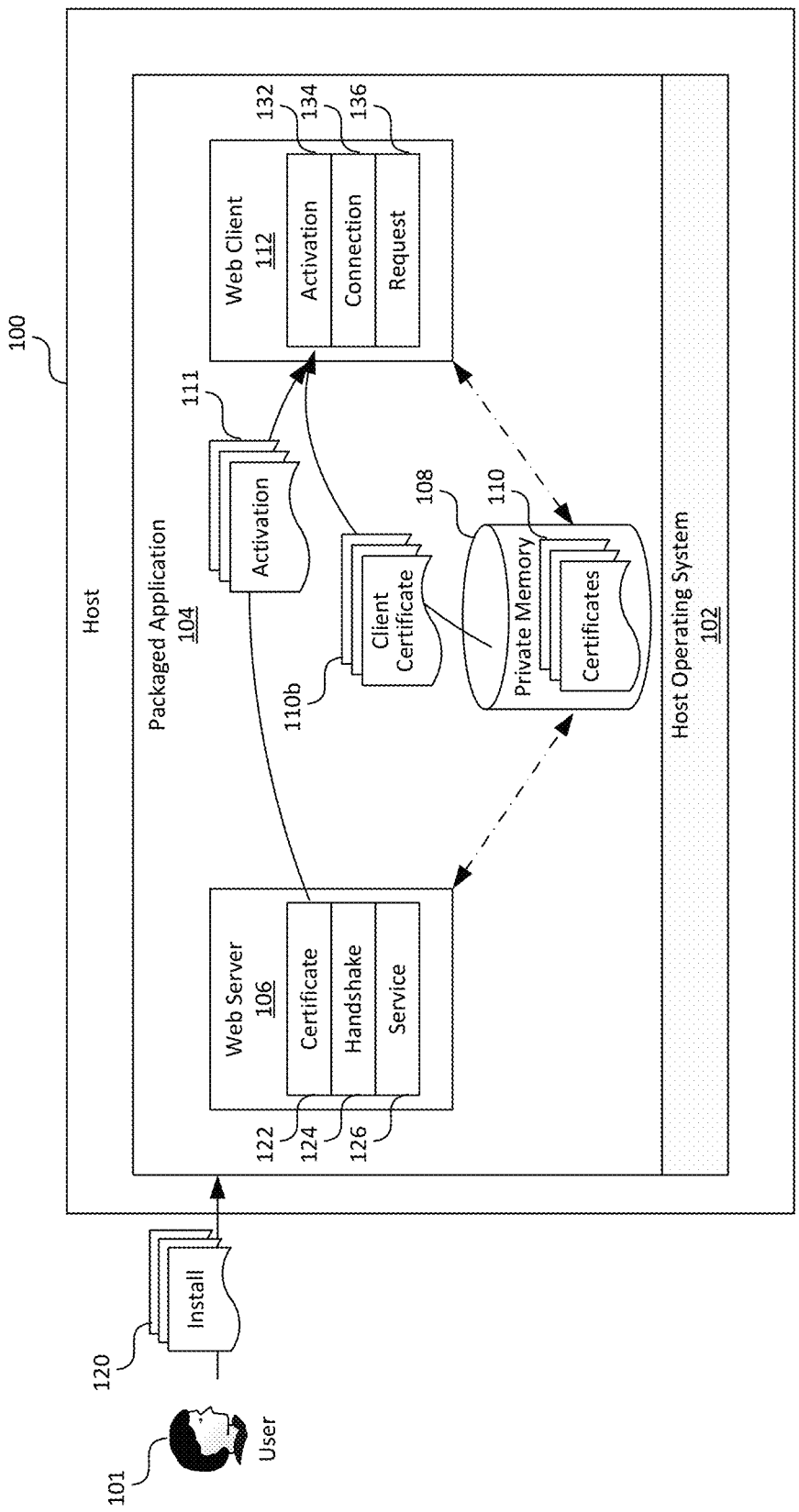

As shown in FIG. 1B, upon receiving the activation instruction 111 and/or during launching the web client 112 in the web browser, the activation component 132 of the web client 112 can be configured to retrieve, from the private memory 108, a copy of the client certificate 110b created by the web server 106. In one embodiment, the activation component 132 can retrieve the client certificate 110b from a designated memory location in the private memory 108. In other embodiments, the activation instruction 111 can include parameters indicating to the activation component 132 the memory location(s) at which the client certificate 110b is stored in the private memory 108. Based on the parameters in the activation instruction 111, the activation component 132 can then retrieve a copy of the client certificate 110b. In further embodiments, the activation component 132 can be configured to query the private memory 108 for the client certificate 110b or perform other suitable operations to retrieve a copy of the client certificate 110b. Additional components of the web server 106 and the web client 112 are described in more detail below with reference to FIGS. 2A-2E.

FIGS. 2A-2E are schematic diagrams of certain hardware/software components of the host 102 of FIGS. 1A and 1B during stages of operation to establish a connection between the web server 106 and the web client 112 in the packaged application 104 in accordance with embodiments of the disclosed technology. Using the automatically generated server/client certificates 110a and 110b, the web server 106 and the co-packaged web client 112 can authenticate each other to reduce or prevent a risk of an unauthorized web application 112' (shown in FIG. 2E) from accessing the web server 106 on the host 100.

In certain embodiments, the packaged application 104 can implement a handshake protocol to authenticate the web server 106 and the web client 112 to each other. In the following description, Transport Layer Security (TLS) or Secure Sockets Layer (SSL) handshake between the web server 106 and the web client 112 were used as example handshake protocols, in other embodiments, the packaged application 104 can also implement 3-way, 4-way, or other suitable types of handshake protocols for establishing the connection between the web server and the web client in the packaged application 104.

Figure 2A:
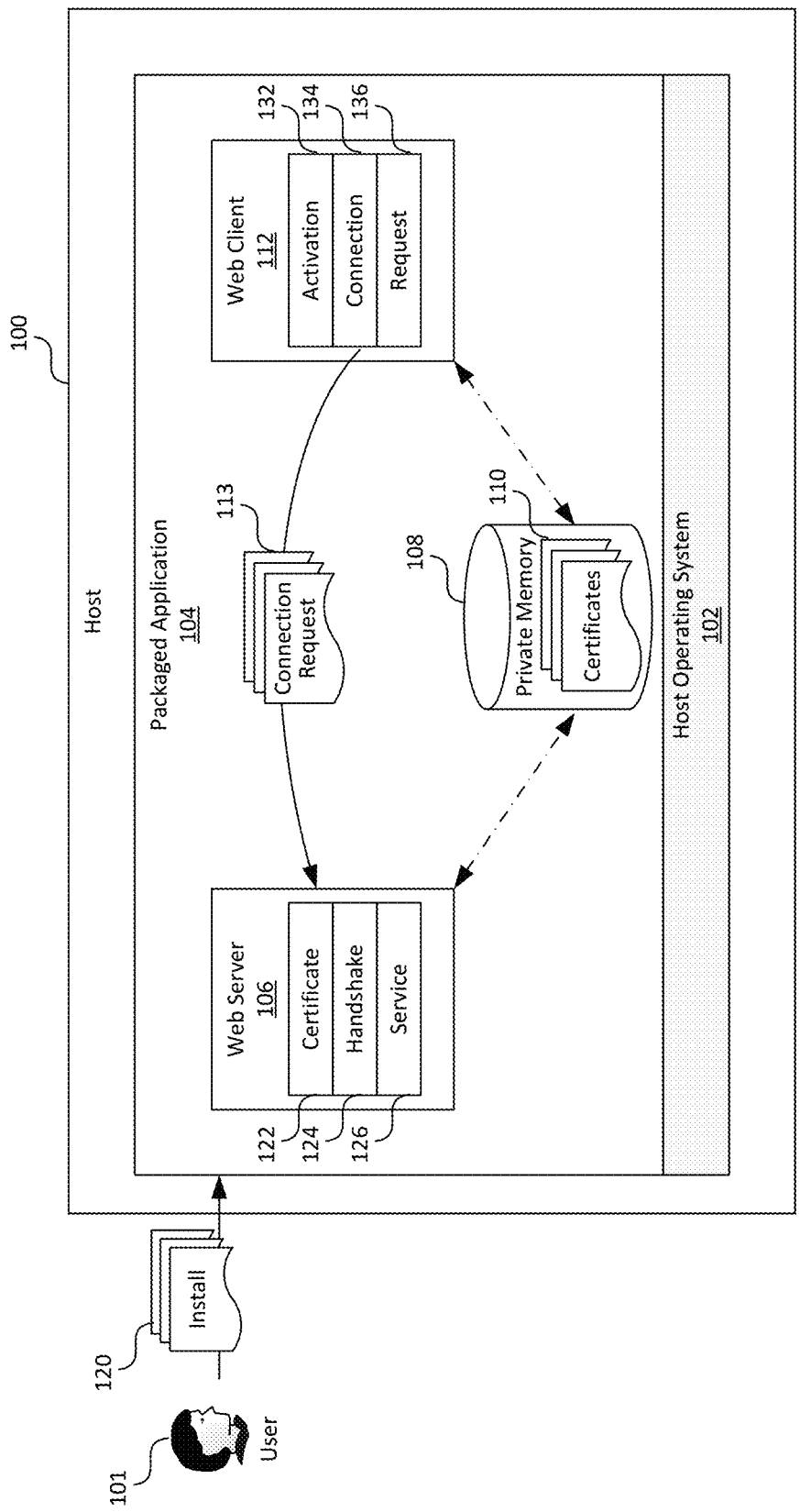
FIGS. 2A-2E are schematic diagrams of certain hardware/software components of the host of FIGS. 1A and 1B during stages of operation to establish a connection between a web server and a web client in the packaged application in accordance with embodiments of the disclosed technology.
Figure 2B:
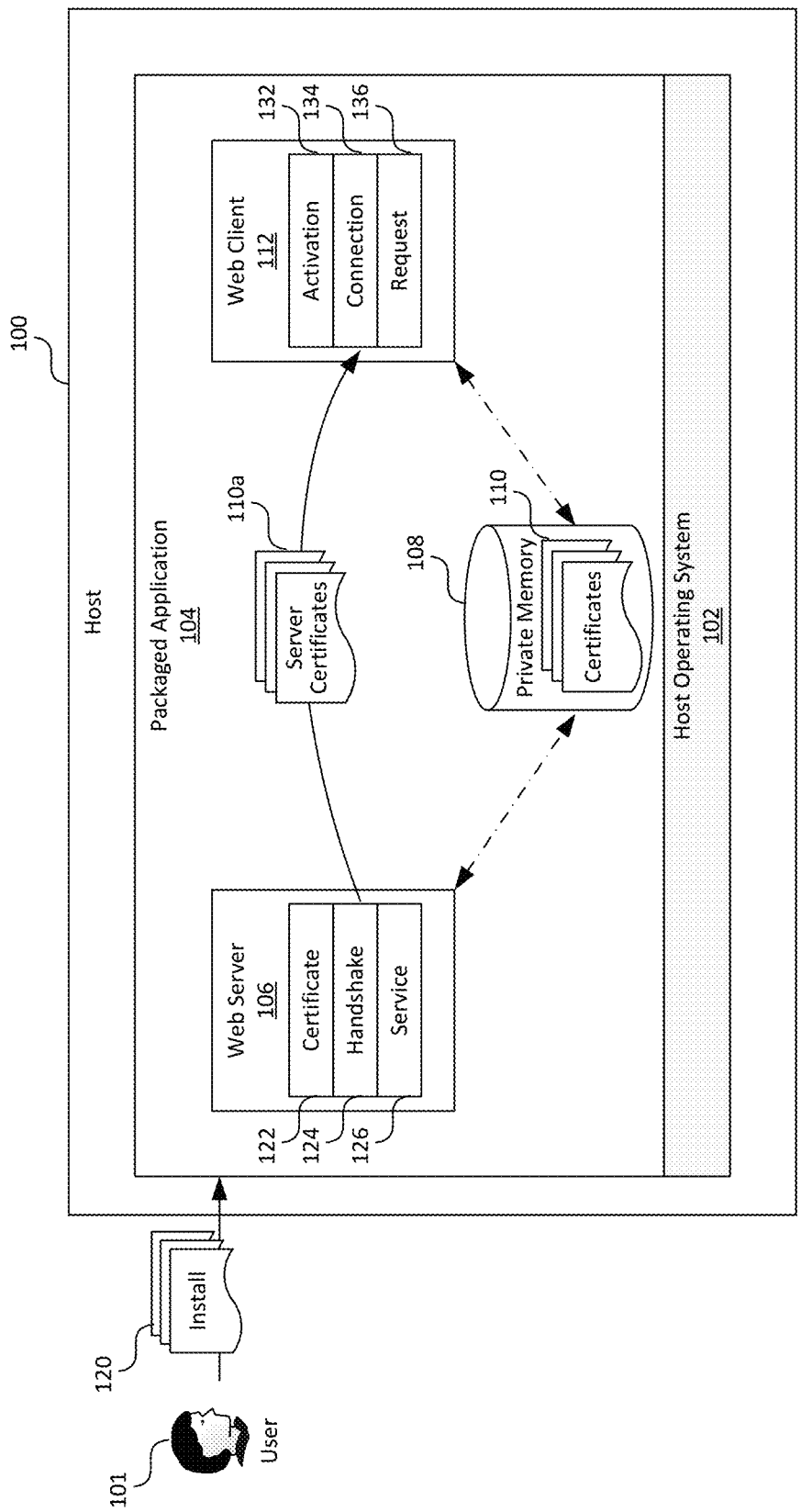

As shown in FIG. 2A, the connection component 134 of the web client 112 can be configured to transmit a connection request 113, for instance, via a port assigned to the web server in the host 100, to the web server 106 along with an identification or other suitable parameters of the web client 112. As shown in FIG. 2B, in response to receiving the connection request 113, the handshake component 124 of the web server can transmit a copy of the server certificate 110a (e.g., containing a public key of the web server 106) self-signed by the web server 106.

The connection component 134 can then be configured to perform certificate pinning based on the received server certificate 110a to authenticate the web server 106. In one implementation, the connection component 134 can authenticate the web server 106 by comparing the received copy of the server certificate 110a with that received as an argument during activation. In another implementation, the connection component 134 can identify the web server 106 as a trusted certificate authority and use the public key of the web server 106 to authenticate a digital signature included in the received server certificate 110a. In further implementations, the connection component 134 can also be configured to authenticate the web server in other suitable ways. Upon authentication, the web client 112 verifies that the identify of the web server 106, and transmits a copy of the client certificate 110b to the web server 106, as shown in FIG. 2C.

Figure 2C:
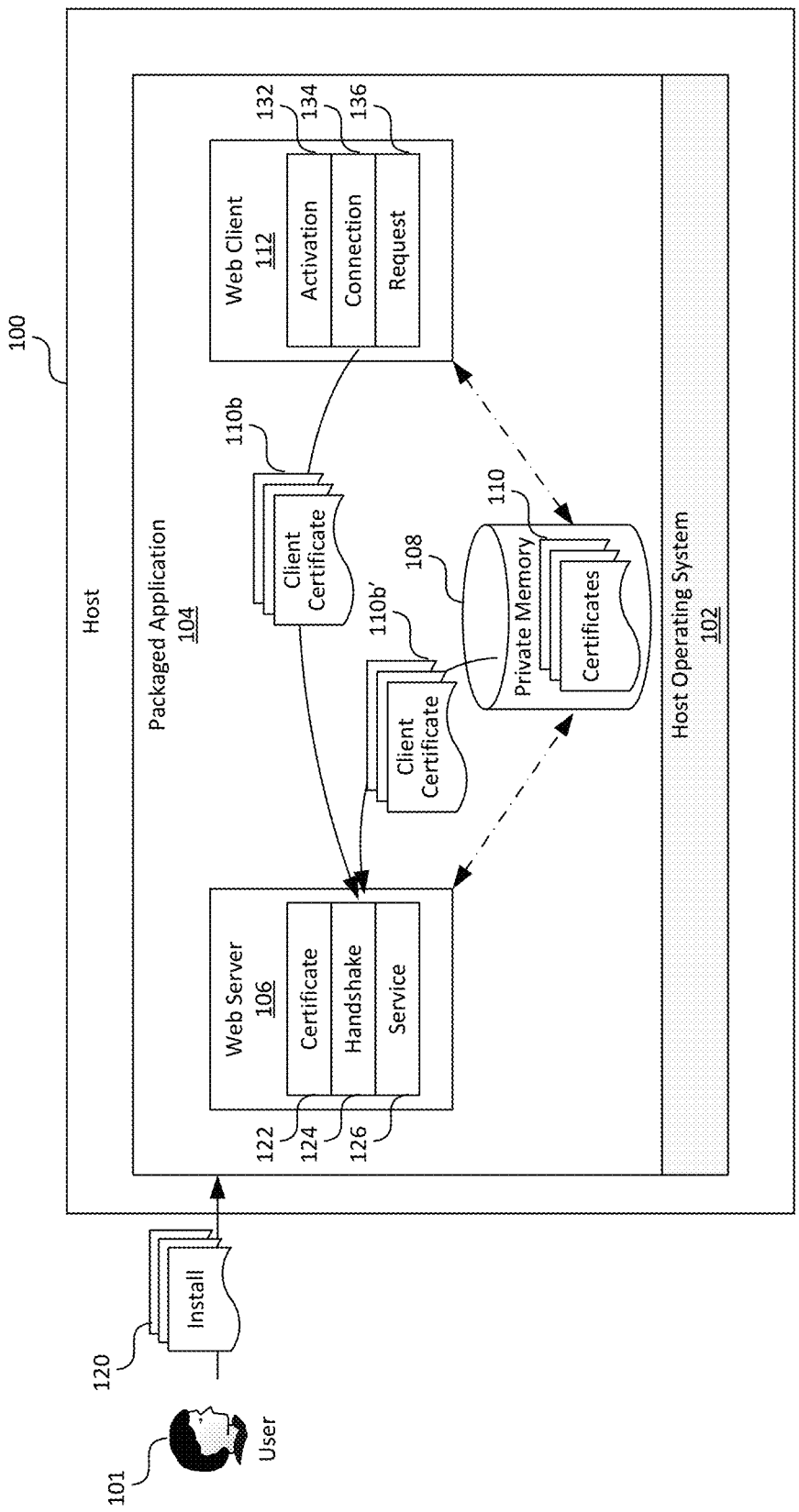

As shown in FIG. 2C, the handshake component 124 can then be configured to authenticate the web client 112 by performing certificate pinning based on the received copy of the client certificate 110b and another copy of the client certificate 110b' retrieved from the private memory 108. Implementations of such certificate pinning can be generally similar to those described above with respect to authenticating the web server 106 based on the server certificate 110a.

Figure 2D:
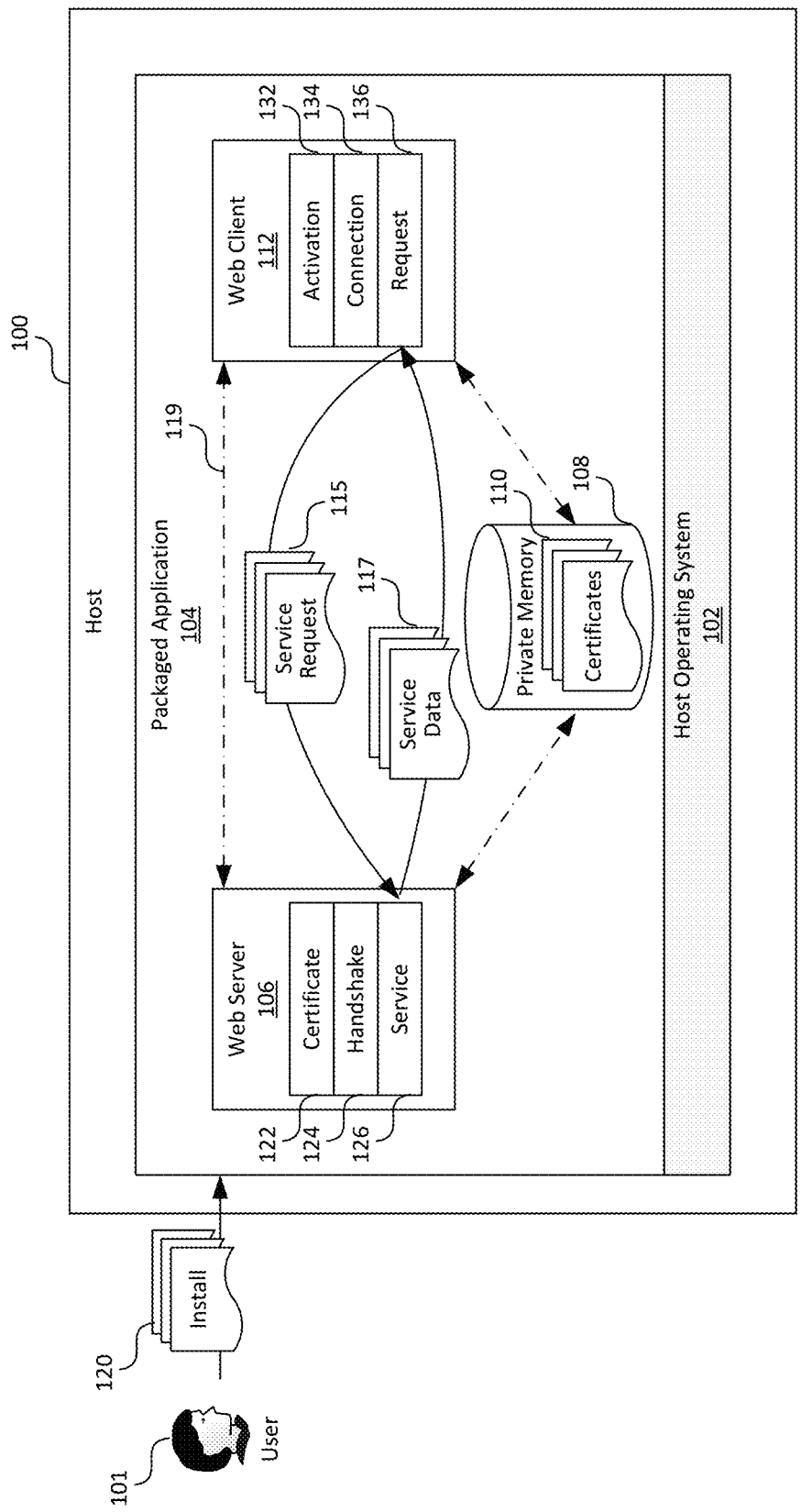

Once authenticated, the handshake component 124 of the web server 106 can allow the requested connection 119 based on which the web client 112 can access various system level services via the web server 106. Using the connection 119, the web client 112 can request and receive content and/or service from the web server 106. For example, as shown in FIG. 2D, the request component 136 of the web client 112 can be configured to transmit service requests 115 to the web server 106. In response, the service component 126 can be configured to perform suitable system level services and provide, to the web client 112, corresponding service data 117 according to, for instance, the HTTP protocol, NT LAN Manager® protocol, or other suitable types of protocol.

Figure 2E:
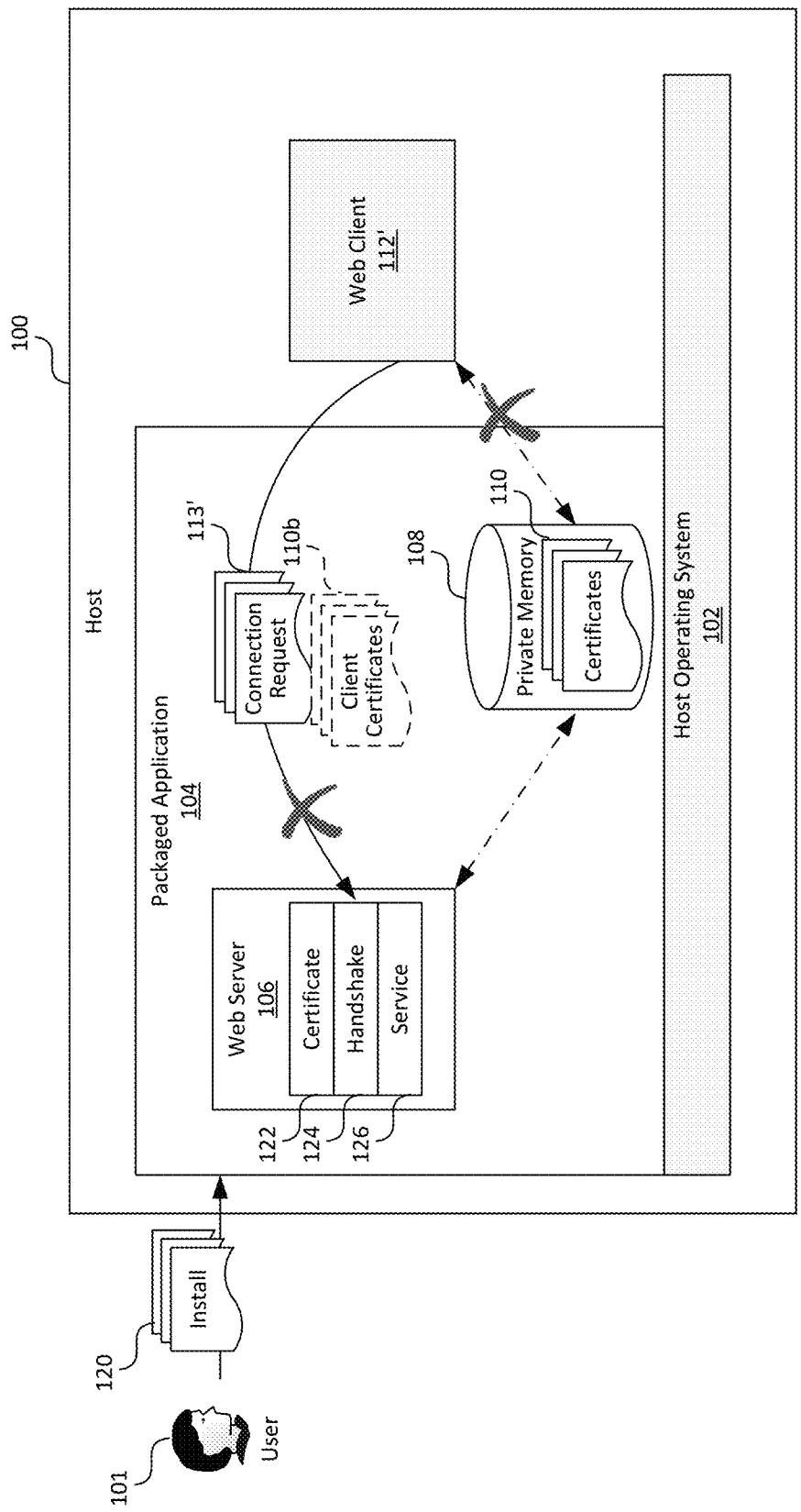

Several embodiments of the disclosed technology described above with reference to FIGS. 2A-2D can reduce or prevent risks of an unauthorized web client 112' from accessing the web server 106 in the packaged application 104, as shown in FIG. 2E. As shown in FIG. 2E, the unauthorized web client 112' is not part of the packaged application 104. As such, the unauthorized web client 112' does not have access to the private memory 108. When the unauthorized web client 112' requests a connection with the web server 106, the unauthorized web client could transmit a connection request 113' to the web server 106, for instance, via the port assigned to the web server 106 on the host 100. However, the unauthorized web client 112' could not provide any or a correct client certificate 110b (shown in phantom lines for clarity) to the web server 106 for authentication. As a result, the web server 106 in the packaged application 104 would refuse the connection request 113' and thus prevent the unauthorized web client 112' from access any system level services via the web server 106. In certain embodiments, the handshake component 124 can be configured to transmit a connection refusal message (not shown) to the unauthorized web client 112'. In other embodiments, the handshake component 124 can be configured to simply ignore the connection request 113' without sending any response.

Figure 3A:
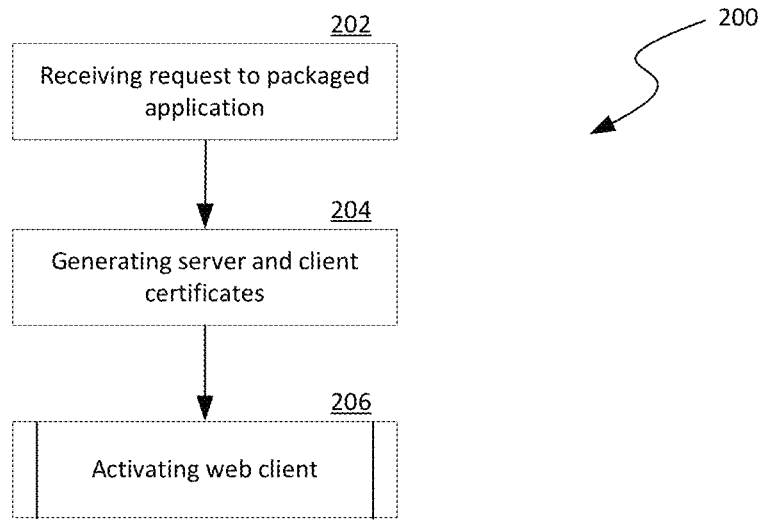
FIGS. 3A-3C are flowcharts illustrating certain processes of memory assignment for guest operating systems in accordance with embodiments of the disclosed technology.
Figure 3B:
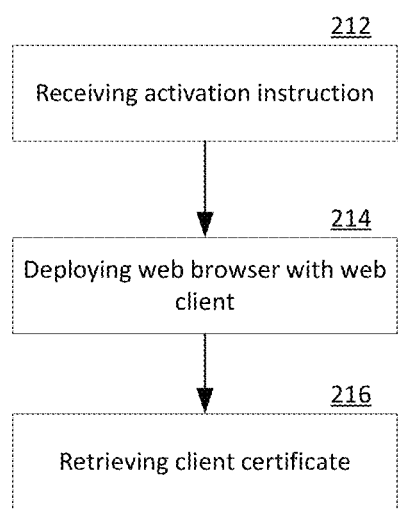
Figure 3C:
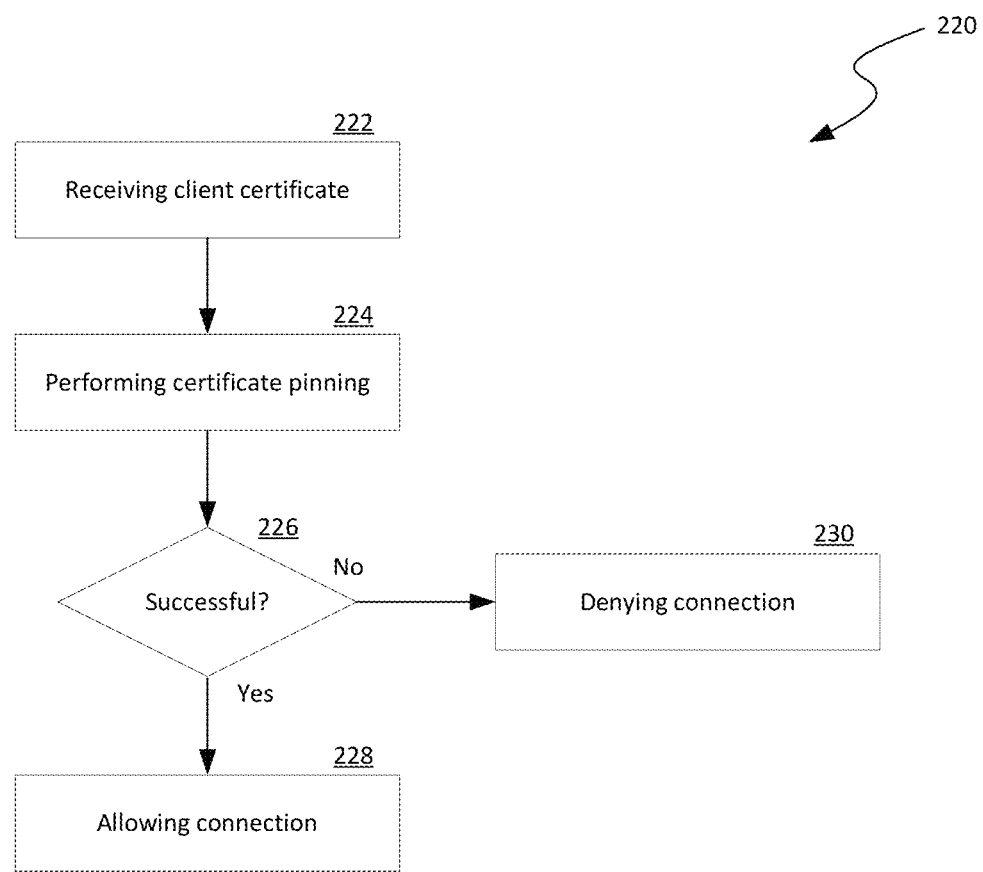

FIGS. 3A-3C are flowcharts illustrating certain processes of memory assignment for guest operating systems in accordance with embodiments of the disclosed technology. Even though embodiments of the processes are described below in the context of the host 100 and the packaged application 104 in FIGS. 1A-2E, in other embodiments, the processes can also be performed in hosts, computing devices, or computing systems with additional and/or different hardware/software components.

As shown in FIG. 3A, a process 200 can include receiving a request for installing, modifying permission, or launching a packaged application at stage 202. The request can be received at, for example, an installation, permission modification, or execution service provided by a host operating system of a host computing device. The process 200 can then include generating a server certificate and a client certificate at a web server of the packaged application at stage 204. The generated server and client certificates can then be stored in a private memory accessible only to components of the packaged application. In certain embodiments, the server and client certificates can be regenerated each time the packaged application is installed, permission modified, or launched. In other embodiments, the generated server and client certificates can have corresponding time-to-live values expiration of which can cause the server and client certificates be regenerated. In further embodiments, the server and client certificates can be regenerated periodically, based on suitable events, or in other suitable manners.

The process 200 can then include activating a web client of the packaged application by the web server at stage 206. In certain embodiments, activation of the web client can include a function call with parameters indicating to the web client that the web server is to be trusted (e.g., by indicating that the web server is a trusted certificate authority). In other embodiments, the parameters can also pass a signature of the web server or other suitable information, as described above with reference to FIGS. 2A-2D. Example operations performed by the web client during activation are described below in more detail with reference to FIG. 3B.

As shown in FIG. 3B, example operations for activating the web client can include receiving an activation instruction from the web server at stage 212. The operations can then include deploying a web browser to instantiate the web client at stage 214. In one implementation, the deployed web browser can be a single page web browser with a single control (or script) corresponding to the web client. In other implementations, the deployed web client can have other suitable configurations. The operations can then include retrieving, by the web client (e.g., by executing a script) to retrieve a copy of the client certificate generated by the web server from the private memory of the packaged application at stage 216, as described above with reference to FIGS. 2A-2D.

FIG. 3C is a flowchart illustrating a process 220 of performing a handshake between a web server and a web client both being a part of a packaged application. As shown in FIG. 3C, the process 220 can include receiving a client certificate by the web server from the web client at stage 222. The process 220 can then include performing certificate pinning at the web server to authenticate the web client is indeed the co-packaged web client based on the received client certificate and a client certificate previously generated by the web server for the web client at stage 224. Example operations for performing such certificate pinning are described above with reference to FIGS. 2A-2D.

The process 220 can then include a decision stage 226 to determine whether authentication based on the received client certificate is successful. In one example, a digital signature in the received client certificate can be compared to another digital signature in the private memory. Then, the operations can include determining whether the digital signatures match each other, and in response to determining that the digital signatures match each other, the operations can include indicating that authentication is successful; otherwise, the operations can include indicating that authentication has failed. In another example, a certificate authority that signed the received copy of the client certificate can be determined. The operations can then include determining whether the certificate authority is web server itself. In response to determining that the certificate authority is web server itself, the operations can include indicating that authentication is successful; otherwise the operations can include indicating that authentication has failed.

In response to determining that authentication based on the received client certificate is successful, the process 220 can include allowing a secured connection with the web client at stage 228. In response to determining that authentication based on the received client certificate is not successful, the process 220 can include denying the connection at stage 230.

Figure 4:
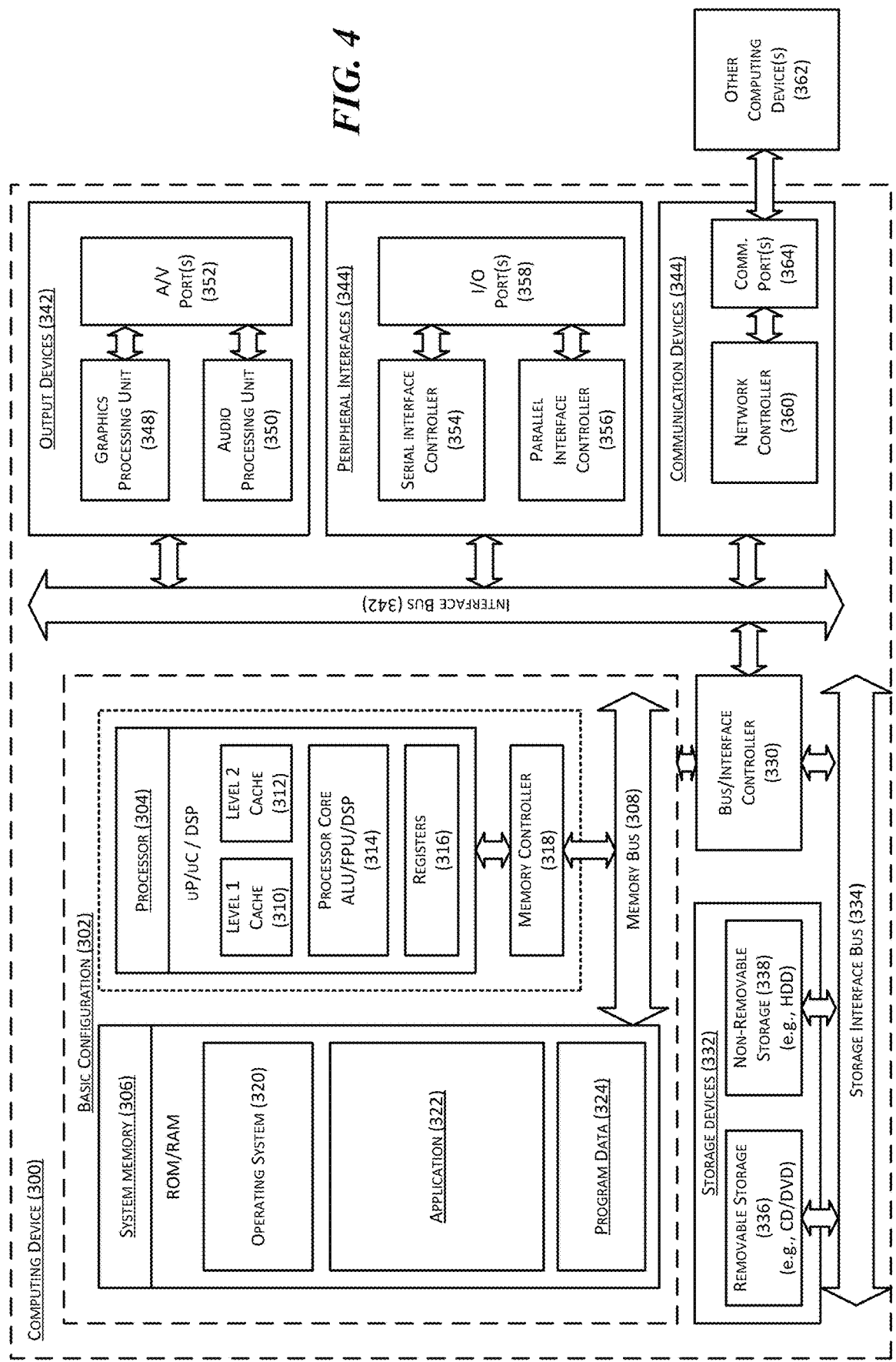
FIG. 4 is a computing device suitable for certain components of the computing device in FIG. 1.

FIG. 4 is a computing device 300 suitable for the host 100 in FIGS. 1A-2D. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 10 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method of automatic generation of app-specific client certification on a host computing device having a host operating system, the method comprising:

receiving a request to install, modify a permission, or launch a packaged application in the host operating system, the packaged application contains both a web server and a corresponding web client, wherein the web server is configured to serve web requests from the web client; and in response to receiving the request, automatically generating, with the web server, data representing a server certificate and a client certificate for the web client;

storing the generated server and client certificates in a private memory allocated by the host operating system to the packaged application, the private memory being accessible to the web server and the web client;

upon completion of generating the server and client certificates, launching, the web client in the packaged application in the host computing device; and during launching of the web client, retrieving, by the web client, a copy of the stored client certificate from the private memory; and authenticating the web client to the web server with the retrieved copy of the stored client certificate and authenticating the web server to the web client using a copy of the stored server certificate to reduce a risk of unauthorized access to the web server by another web client executing on the same host computing device.

2. The method of claim 1, further comprising:
regenerating the server and client certificates each time upon receiving a request to install, modify a permission, or launch the packaged application in the host operating system.

3. The method of claim 1 wherein:
the generated server and client certificates individually have a time-to-live value; and
the method further includes regenerating the server and client certificates each time upon expiration of the time-to-live value.

4. The method of claim 1 wherein automatically generating includes:
automatically generating, with the web server, data representing the server certificate and the client certificate for the web client, the server and the client certificates individually include one or more of:
a private key;
a public key;
a digital signature;
identification of the installed instance of the packaged application;
an identification of the installed web server, or
an identification of an extension of the installed web server.

5. The method of claim 1 wherein automatically generating includes:
automatically generating, with the web server, data representing the server certificate and the client certificate for the web client, the client certificates includes identification of the web server as a trusted certificate authority.

6. The method of claim 1 wherein:
storing the generated server and client certificates includes storing the generated server and client certificates in a designated memory location in the private memory; and
retrieving the copy of the stored client certificate includes retrieving, by the web client, a copy of the stored client certificate from the designated memory location in the private memory.

7. The method of claim 1 wherein:
storing the generated server and client certificates includes storing the generated server and client certificates in a random memory location in the private memory;
activating the web client includes passing a memory address of the random memory location from the web server to the web client; and
retrieving the copy of the stored client certificate includes retrieving, by the web client, a copy of the stored client certificate from the random memory location in the private memory identified by the memory address memory location.

8. The method of claim 1, further comprising:
performing handshaking between the web server and the web client using the generated server and client certificates; and
allowing the web client to access system level services via the web server upon a successful completion of the handshaking.

9. The method of claim 1 wherein:
performing handshaking between the web server and another web client using the generated server and client certificates; and
denying the another web client access to system level services via the web server upon a failure to complete the handshaking.

10. A computing device having a host operating system, the computing device comprising:
a processor; and
a memory operatively coupled to the processor, the memory containing instructions executable by the processor to cause the computing device to:
upon receiving a request to install, modify a permission, or launch a packaged application in the host operating system,
generate, with a web server of the packaged application, data representing a server certificate and a client certificate for a web client co-packaged with the web server, wherein the web server is configured to serve web requests from the web client;
store the generated server and client certificates in a private memory allocated by the host operating system to the packaged application, the private memory being accessible to the web server and the web client;
upon completion of generating the server and client certificates, launching the co-packaged web client in the packaged application in the computing device; and
during launching of the co-packaged web client, retrieve, by the web client, a copy of the stored client certificate from the private memory; and thereby cnablingauthenticating the co-packaged web client to authenticate to the web server of the packaged application and authenticating the web server to the web client with a copy of the stored server certificate during operation to reduce a risk of unauthorized access to the web server by another web client executing on the same computing device.

11. The computing device of claim 10 wherein the memory contains additional instructions executable by the processor to cause the computing device to:
regenerate the server and client certificates each time upon receiving a request to install, modify a permission, or launch the packaged application in the host operating system.

12. The computing device of claim 10 wherein:
the generated server and client certificates individually have a time-to-live value; and
wherein the memory contains additional instructions executable by the processor to cause the computing device to regenerate the server and client certificates each time upon expiration of the time-to-live value.

13. The computing device of claim 10 wherein to generate the data representing the server certificate and the client certificate includes:
generating, with the web server, data representing the server certificate and the client certificate for the web client, the client certificates includes identification of the web server as a trusted certificate authority.

14. The computing device of claim 10 wherein:
the generated server and client certificates are stored in a random memory location in the private memory;
to activate the web client includes to pass a memory address of the random memory location from the web server to the web client; and
to retrieve the copy of the stored client certificate includes to retrieve, by the web client, a copy of the stored client certificate from the random memory location in the private memory identified by the memory address memory location.

15. The computing device of claim 10 wherein the memory contains additional instructions executable by the processor to cause the computing device to:
   perform authentication of the web client using the generated client certificates stored in the private memory; and
   allow a connection to the web client to access system level services via the web server upon a successful authentication.

16. The computing device of claim 10 wherein the memory contains additional instructions executable by the processor to cause the computing device to:
   perform authentication of another web client using the generated client certificates stored in the private memory; and
   deny a connection request from the another web client to access system level services via the web server upon an authentication failure.

17. A method of automatic generation of app-specific client certification on a host computing device having a host operating system, the method comprising:
   receiving, at a web server in a packaged application containing a co-packaged web client, a connection request from a web client and a first copy of a client certificate from the web client, wherein the web server is configured to serve web requests from the co-packaged web client;
   upon receiving the client certificate, authenticating the connection request from the web client using a second copy of a client certificate previously generated by the web server for the co-packaged web client and stored in a private memory accessible to the web server and the co-packaged web client; and
   in response to successfully authenticating, based on both the first and second copies of the client certificate, that the web client is indeed the co-packaged web client in the packaged application, establishing, with the web server, a secure connection with the web client to allow the web client access to system level services on the same host computing device in response to the received connection request.

18. The method of claim 17, further comprising:
   in response to a failure to authenticate, based on both the first and second copies of the client certificate, the web client, denying connection to the web client for access to system level services on the computing device.

19. The method of claim 17 wherein authenticating the connection request includes:
   comparing a digital signature in the first copy of the client certificate to another digital signature in the second copy of the client certificate;
   determining whether the digital signatures match each other;
   in response to determining that the digital signatures match each other, indicating that authentication is successful; and
   in response to determining that the digital signatures do not match each other, indicating that authentication has failed.

20. The method of claim 17 wherein authenticating the connection request includes:
   identifying a certificate authority that signed the received first copy of the client certificate;
   determining whether the certificate authority is web server itself;
   in response to determining that the certificate authority is the web server itself, indicating that authentication is successful; and
   in response to determining that the certificate authority is not the web server itself, indicating that authentication has failed.

* * * * *